United States Patent [19]

Bernstein

[11] Patent Number: 5,050,143
[45] Date of Patent: Sep. 17, 1991

[54] DEVICE FOR OPTICAL READING AND MAGNETIC WRITING ON A DATA CARRIER

[75] Inventor: Pierre Bernstein, Neauphle-le-Chateau, France

[73] Assignee: Bull, S.A., Paris, France

[21] Appl. No.: 253,038

[22] Filed: Oct. 4, 1988

[30] Foreign Application Priority Data

Oct. 5, 1987 [FR] France ................. 87 13739

[51] Int. Cl.$^5$ ................. G11B 11/10; G11B 13/04
[52] U.S. Cl. ................. 369/13; 360/114; 369/110
[58] Field of Search ................. 369/13, 110, 103; 360/114, 59

[56] References Cited

U.S. PATENT DOCUMENTS 4,029,944 6/1977 Trenhamp ................. 235/440
4,893,207 1/1989 Maury et al. ................. 360/114

FOREIGN PATENT DOCUMENTS 123048 10/1984 European Pat. Off. .
168699 1/1986 European Pat. Off. .
3334120 3/1984 Fed. Rep. of Germany .
1523756 3/1968 France .
61-198455 9/1986 Japan ................. 369/13

OTHER PUBLICATIONS

Patent Abstracts of Japan, vol. 7, No. 245 (P-233)(1390), Oct. 29, 1983; & JP-A-58 130 458 (Sharp K.K.) 03-08-1983.
Patent Abstracts of Japan, vol. 10, No. 143 (P-459)(2200), May 27, 1986; & JP-A-60 261 052 (Fujitsu K.K.) 24-12-1985.
Patent Abstracts of Japan, vol. 8, No. 211 (P-303)(1648), Sep. 26, 1984; & JP-A-59 94 257 (Olympus Kogaku Kogyo K.K.) 30-05-1984.

Primary Examiner—Stuart S. Levy
Assistant Examiner—Hoa Nguyen
Attorney, Agent, or Firm—Kerkam, Stowell, Kondracki & Clarke

[57] ABSTRACT

An optical reading and magnetic writing device for data on a magnetooptic recording carrier including a writing transducer (TRI) of data on the carrier disposed on a flying head (PATI), a light source (SLI) emitting a beam of polarized incident light (F$_i$) onto the surface of the carrier, a holographic lens (LHI) for focusing the incident beam (F$_i$) onto the surface of the carrier, affixed to the head, a separator element (ESI) separating the incident beam from the reflected beam, and a detector (MDKI) for detecting the angle of rotation of the plane of polarization of the light. According to the invention, the optical reading and magnetic writing device is characterized in that the light source (FLI) is disposed and fixed on the head (PATI). The invention is applicable to magnetooptic disk memories.

16 Claims, 4 Drawing Sheets

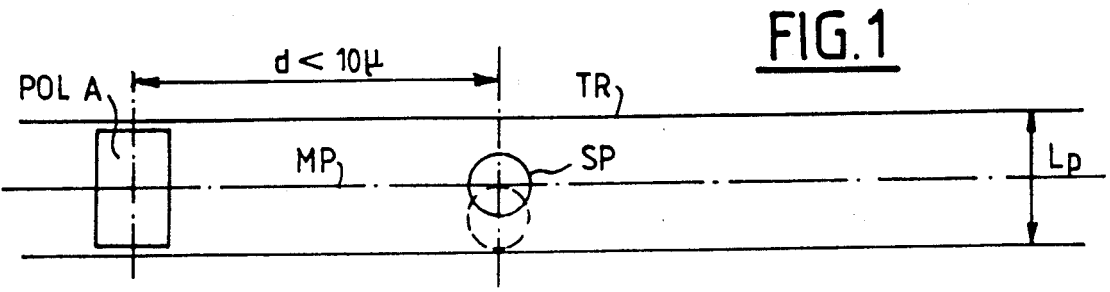
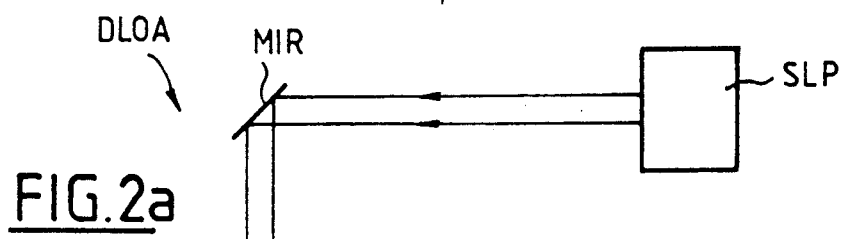
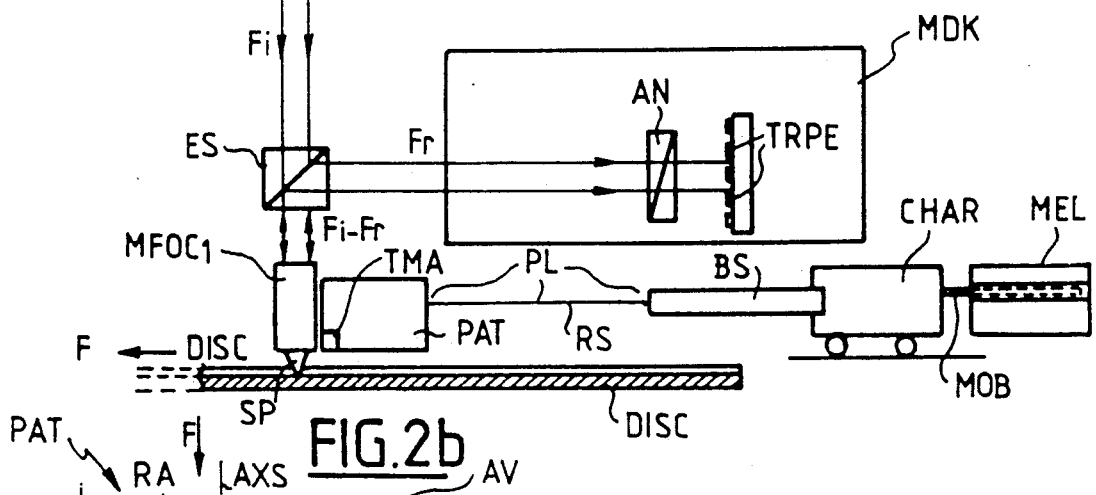
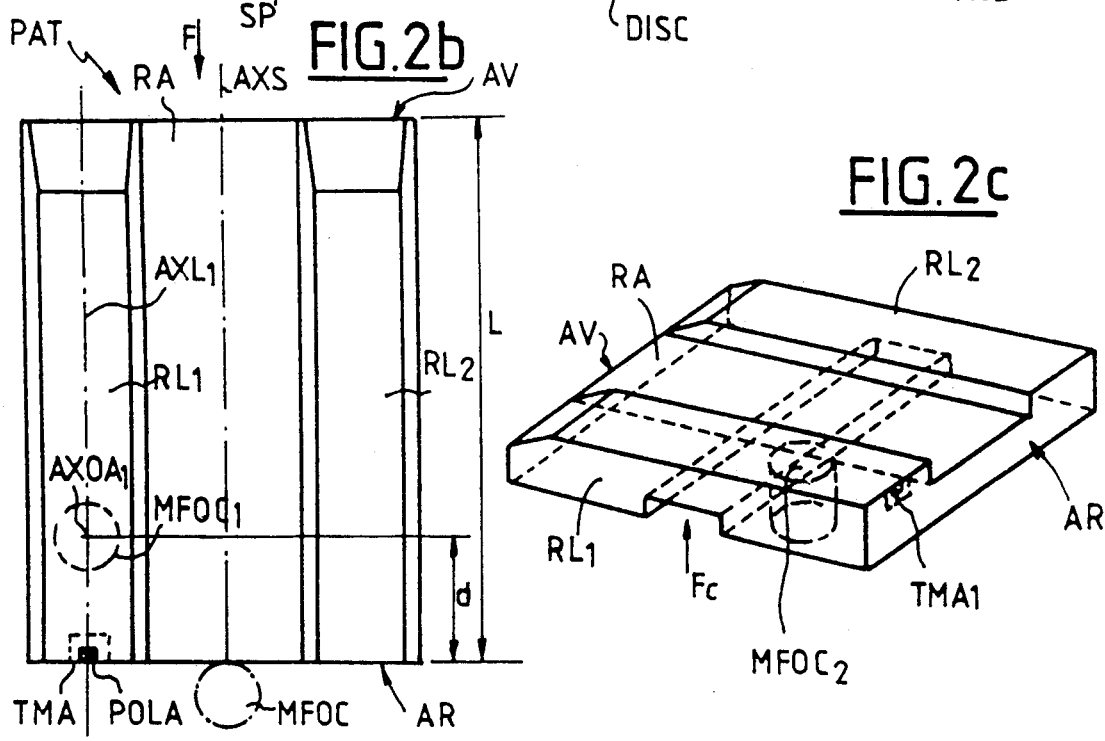

DEVICE FOR OPTICAL READING AND MAGNETIC WRITING ON A DATA CARRIER

FIELD OF THE INVENTION

The present invention relates to a device for optical reading and magnetic writing on an information carrier. It is applicable in particular to reading and writing data on magnetic disks of a magnetooptic disk memory.

Magnetooptic disk memories are memories where the data are recorded on the magnetic disks and read by optoelectronic devices. The trend in the industry is to increasing use of such memories because they make it possible to obtain radial densities on the order of several thousand tracks per centimeter and longitudinal densities of 10,000 data per centimeter.

Their mode of operation is based on the magnetooptic effect, which relates to the interaction of a rectilinear polarized beam of light with the magnetic state of the material comprising the recording layer of magnetic disks. Reading of the data is performed by an optoelectronic device including an optical focusing device of variable complexity associated with photoelectronic transducers and amplification circuits for the signals furnished by these transducers. These optoelectronic devices make it possible to observe at a given moment, at a given site, one surface of a disk by means of a polarized light and to furnish an electrical signal the voltage (or current) of which is a function of the value of the data located at this site. French Patent 2.514.913, filed by Compagnie Internationale pour L'Informatique CII HONEYWELL BULL on Oct. 16, 1981, provides extensive detail on the magnetooptic effect and on the manner in which the data contained on the magnetic disks of a magnetooptic memory can be read. The corresponding is U.S. Pat. No. 4,510,544.

More precisely, the optoelectronic reading device described in the above-mentioned patent includes the following:

- a light source emitting a beam of polarized light on the surface of the magnetooptic disk at a predetermined site thereon, the interaction of the beam with the magnetic state of the disk at this site producing a rotation of the plane of polarization of the light;
- optical means for focusing the beam on the surface of the disk, the path of the beam on the disk forming a light spot and being reflected by the disk and then transmitted by these means to a separator element that separates the incident beam from the reflected beam;
- and means for detecting the angle of rotation of the plane of polarization of the light, which furnish an electrical signal the voltage (or current) of which is a function of the value of the data located at this site.

Thus as stated in this patent, the focusing means and the separator element and the means for detecting the angle of rotation of the plane of polarization are all disposed on a platform capable of displacement relative to the tracks of the disk, the platform including a support arm integrally connected to a suspension spring that carries a head (in this patent, the head is called a "main body"), containing a magnetic transducer for writing data on the disk. The head flies above the disk at a distance of several tenths of microns. The source of the polarized light is not disposed on the platform.

European Patent Application, published as No. 0 115 458, and filed on Jan. 23, 1984, as Serial No. 84400144.6, with a French priority of Jan. 25, 1983, filed by Compagnie Internationale pour L'Informatique CII HONEYWELL BULL, describes an improvement to the device described in the above-mentioned French Patent and matured into corresponding U.S. Pat. No. 4,633,450, in which writing is performed by a magnetic transducer, and reading is performed by an optical focusing device placed inside a housing made on the inside of the head (or main body). This head is of the lightweight Winchester type and for example comprises a catamaran including at least two rails or skis and a groove disposed between them. The focusing optical device is located at a distance from the data carrier greater than or equal to the height of the flight of the head with respect to the magnetic disk. Thus again because of the conditions of flight of the held above the magnetooptic disk, which keep the face of the head facing the disk at a distance from the disk, the amplitude of fluctuation of this distance being less than the depth of the field of the focusing optical device, it will be understood that by disposing the focusing optical device in a suitable manner inside the head, the focusing of this device with respect to the magnetooptic disk can be made constant over the entire time that the flight of the head above the magnetooptic disk persists. In this way, the use of an automatically controlled device for focusing, which is heavy and expensive, can be avoided.

In practice in this field, the attempt is made to reread the data written by the magnetic writing transducer, using the optical reading device, as soon as the data have been recorded. This considerably improves the access time to the data written on the magnetooptic disk, while retaining the possibility of rewriting the data considered to be erroneous as soon as they are found, by means of the optical reading device, to be erroneous. This is very important for writing data in a magnetooptic memory where the crude error rate is not inconsiderable and is estimated to be on the order of $10^{-5}$ (that is, one erroneous datum per $10^5$ written data). This requires the permanent placement of the writing pole of the magnetic writing transducer and of the light spot facing the same track. Since the width of the tracks is on the order of 2 $\mu$m, and the width of the spot is on the order of 1 $\mu$m, displacement of the light spot with respect to the writing pole by more than one-half micron on either side of the middle of the track that is being written on and read from, during the course of the writing and reading operations, cannot be tolerated, or else the transducer will be located facing the adjoining track.

Any optical reading and magnetic writing device faces the two following problems, illustrated by FIG. 1:

- because of the relatively great curvature of the tracks of the disk, which is due to their small diameter (on the order of several centimeters) it can be shown by calculation that the distance d between the writing pole POLA of the magnetic writing transducer and the light spot SP must remain less than about 10 $\mu$m, so that these elements will remain facing the same track;
- moreover, the head which carries the focusing lens and the magnetic writing transducer is incited to rotational movement (as well as translation but this phenomenon is less important) with respect to the beam of light (the light source being located outside the platform) because of the wobble of the disk and irregularities on its surface, which can cause displacements of the light spot with respect to the middle MP of the track TR.

The disadvantage of the optical reading devices described in the above-mentioned patent and patent application is that the requirement for precision in the positioning of the light spot with respect to the writing pole cannot be met. In fact, because of the problems mentioned above, the beam of light can be displaced by several microns or even several tens of microns with respect to the writing pole and it is then located facing a different track of the disk from that faced by the writing pole. Under these conditions, it is then necessary to displace the platform such that the reading device is located facing the track that has been written by the magnetic transducer. This lengthens the access time to the data that have just been written.

SUMMARY OF THE INVENTION

The present invention makes it possible to overcome this disadvantage by disposing the various constituent elements of the optical reading device on the head including the magnetic writing transducer, and by affixing the various elements to each other, the distance between the light spot and the writing pole of the magnetic transducer is on the order of 10μm or less.

According to the invention, the device for optical reading and magnetic writing of data on a magnetooptic recording carrier, includes:
- a transducer for writing data on the carrier disposed on a head flying above the carrier;
- a light source emitting a beam of polarized light onto the surface of the carrier at a predetermined site thereof, the interaction of which with the magnetic state of the carrier at this site produces a rotation of the plane of polarization of the light;
- optical means for focusing the incident beam onto the surface of the carrier, the path of which on the carrier forms a light spot, and which is reflected by the carrier and then transmitted by these means to a separator element separating the incident beam from the reflected beam;
- means for detecting the angle of rotation of the plane of polarization of the light furnishing an electrical signal the voltage (or current) of which is a function of a value of the data located at this site; and
- is characterized in that the source of polarized light is disposed and fixed on the head containing the writing transducer.

In a preferred embodiment of the invention, the optical focusing means comprise a holographic lens, which is for example fixed on the upper part of the head and forms an angle of approximately 45° with the surface of this part (the upper part of the head is the surface thereof that is parallel to the carrier and is not disposed facing the carrier; the surface located facing the carrier is called the flight surface).

In another embodiment of the invention, the plane of the thin films comprising the magnetic writing transducer forms an angle with the normal to the magnetooptic recording carrier equal to one-half the opening angle of the incident beam of light produced by the holographic lens.

Further characteristics and advantages of the present invention will become apparent from the ensuing detailed description, given solely by way of non-limiting example, and referring to the accompanying drawings.

BRIEF DESCRIPTION OF THE DRAWINGS

FIG. 1 illustrates the requirements that must be met by the optical reading and magnetic writing device according to the invention in terms of the displacement of the light spot with respect to the writing pole of the magnetic writing transducer, on the one hand, and with respect to the middle of a written track, on the other;

FIG. 2, comprising FIGS. 2a, 2b and 2c, shows an optical reading and magnetic writing device for a magnetooptic data carrier in accordance with the prior art as described in the above-mentioned French patent;

DESCRIPTION OF THE PREFERRED EMBODIMENTS

Figure 3:
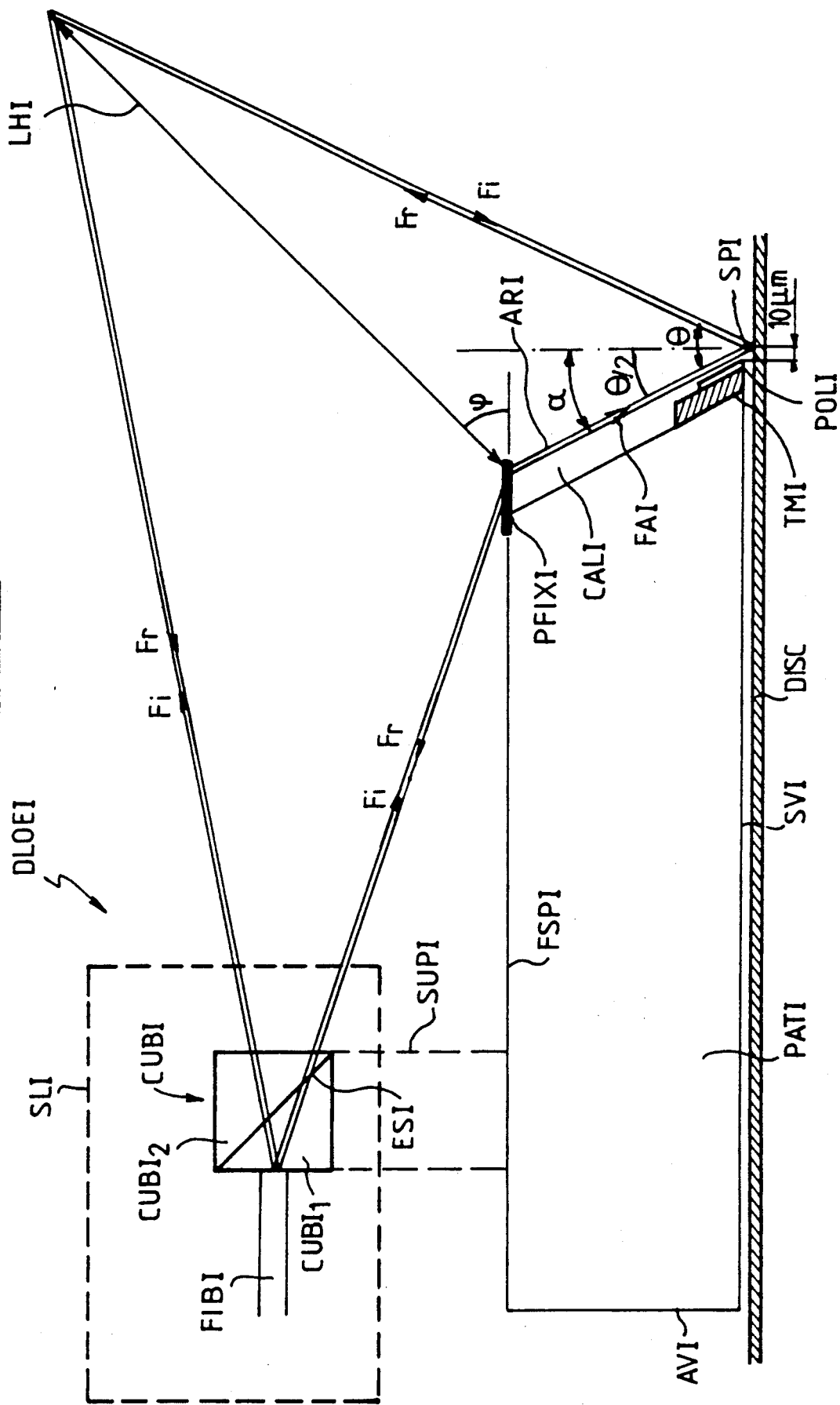
FIG. 3 is a side view showing a first embodiment of the optical reading and magnetic writing device for data on a magnetooptic recording device according to the invention.

For better understanding how the optical reading and magnetic writing device according to the invention is constituted, it will be useful to review an optical reading device according to the prior art, as shown in FIGS. 2a, 2b, 2c, as described either in the aforementioned U.S. Pat. No. 4,510,544 or the aforementioned U.S. Pat. No. 4,633,450. The optical reading device DLOA of the prior art shown in FIGS. 2a and 2b includes:
- the source of polarized light (which is preferably monochromatic) SLP emitting a beam of incident light $F_i$,
- the mirror MIR,
- the separator element ES,
- focusing means MFOC for focusing the incident light beam $F_i$ onto the magnetooptic disk DISC, which is reflected by the disk and becomes the reflected beam $F_r$, the path of the beam of the light $F_i$ on the disk DISC forming the light spot SP, and
- means MDK for Kerr effect detection of the binary data recorded on each track of the magnetooptic disk DISC.

The light source SLP transmits the beam of light $F_i$ onto the magnetooptic disk DISC by the successive intermediary action of the mirror MIR, the separator element ES, and the focusing means MFOC (generally comprising a focusing lens). The reflected beam $F_r$ is such that its electrical field vector has undergone a rotation of $\pm\theta_k$ by the Kerr effect (see U.S. Pat. No. 4,510,544) with respect to the electrical field vector of the incident beam $F_i$. This beam $F_r$ is transmitted via the focusing means MFOC and the separator element ES to the detection means MDK. In a known manner, the detection means include a light analyzer AN associated with a plurality of photoelectronic transducers. The analyzer element AN has a preferential direction of propagation of the light that forms a given angle with the electrical field vector of the beam $F_i$. The light power collected by the analyzer AN is converted by the photoelectronic transducers, which in turn are associated with electronic amplifier circuits, not shown in FIG. 2a for the sake of simplification, into an electrical signal the voltage (or current) of which is a function of the value of the binary data recorded on the disk DISC at the location where the light spot SP is found.

Thus as indicated in the aforementioned U.S. Pat. No. 4,510,544, preferably the majority of the elements of the reading device DLOA are mounted on a platform PL, except for the source of polarized light SLP. This platform PL includes the support arm BS fixed on one of its ends, for example to a movable carriage CHAR outside the disk DISC. This movable carriage is in turn integrally connected to the movable portion MOB of a linear electrodynamic motor MEL. The other end of the support arm BS is integrally connected to a suspension spring RS which carries a flying head PAT. This head for instance includes an electromagnetic transducer TMA for writing data on the disk DISC. The structure of the flying head PAT is known. It will be briefly reviewed below in conjunction with FIGS. 2b, 2c, which are a view from below and a perspective view of this head.

In FIG. 2b, the data carrier, that is, the disk DISC, is assumed to travel in the direction of the arrow F. The head PAT is of the catamaran type; that is, it includes two rails $RL_1$ and $RL_2$ separated by a groove RA. The part of the head that is the first in the course of time to see the data travel past it is the leading part AV of the head, while the rear part AR of the head is the part of the head that is the last in the course of time to see the data traveling past it. The axis of longitudinal symmetry of the head PAT is shown as AXS (that is, the axis parallel to the direction of travel F of the data).

As indicated above, the head PAT includes a magnetic writing transducer TMA disposed on the rear AR thereof, for example on the rail $RL_1$. The transducer TMA has a writing pole POLA.

In the embodiment described in U.S. Pat. No. 4,510,544 referred to above, the focusing means MFOC are disposed on the axis of symmetry AXS and at the trailing part of the head PAT, in such a way that these means see the data of each track of the disk travel past them, these data having been written earlier by the transducer TMA.

In the preferred embodiment described in the aforementioned U.S. Pat. No. 4,633,450, the optical focusing means $MFOC_1$ shown in broken lines in FIG. 2b and 2c are disposed inside a housing made in the rail $RL_1$. The longitudinal axis of symmetry of the focusing means coincides with the longitudinal axis of symmetry of the magnetic writing transducer TMA, which in turn coincides with the longitudinal axis of symmetry $AXL_1$ of the rail $RL_1$, which is parallel to the axis of symmetry AXS.

The distance between the optical axis $AXOA_1$ of the focusing means $MFOC_1$, perpendicular to the plane of the disk DISC and the writing pole POLA, defined as d, is on the order of several tenths of a millimeter or even one millimeter.

The total surface area of the rails $RL_1$ and $RL_2$ comprises the flight surface of the head PAT. The force due to the pressure of the air on this surface when the disk DISC travels in the direction of the arrow facing the head PAT is balanced by a weighting force, known as a weight $F_c$, on the order of about 10 grams.

Figure 4:
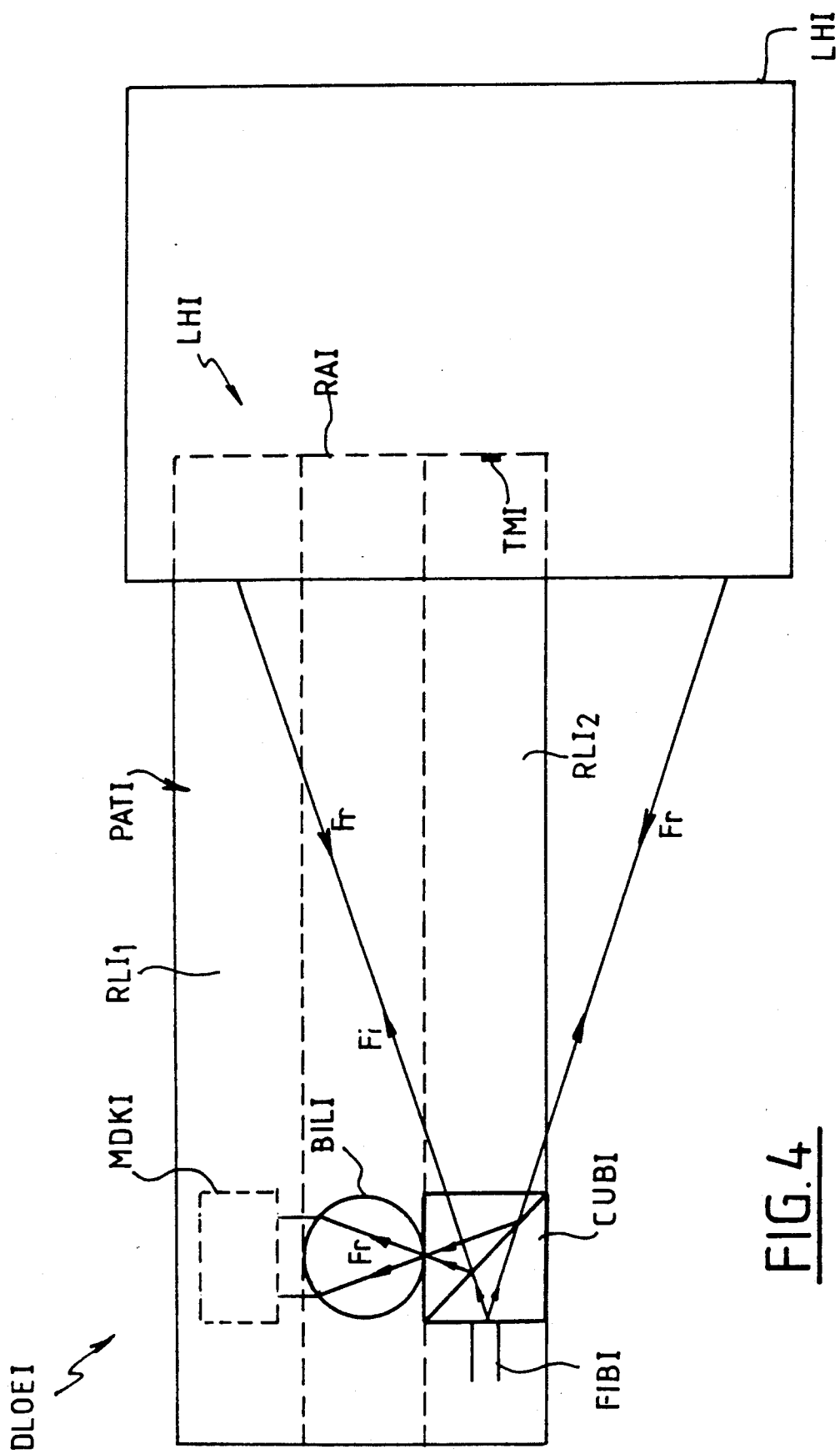
FIG. 4 is a plan view showing the optical reading and magnetic writing device according to the invention.

The optical reading and magnetic writing device for data on a magnetooptic recording carrier according to the invention shown in FIGS. 3 and 4 makes it possible to solve the above-mentioned problems illustrated by FIG. 1.

Thus, as shown in FIGS. 3 and 4, this device DLOEI according to the invention includes the following elements:

the source of polarized light SLI formed by the association of an optical fiber of the multimode type FIBI and a cube CUBI for polarization separation, in which the coupling coefficient between the fiber and the cube is quite high, the holographic lens LHI forming the means for focusing the incident beam $F_i$ produced by the light source SLI, transmission means BILI which transmit the reflected beam $F_r$ produced by the holographic lens LHI, Kerr effect detection means MDKI receiving the beam transmitted by the means BILI furnishing a signal the voltage/current of which is a function of the value of the data recorded on the magnetooptic disk DISC, and the magnetic transducer for writing data on the disk DISC, disposed on the flying head PATI.

The light source SLI, the holographic lens LHI, and the Kerr effect detection means MDKI, as well as the transmission means BILI, are affixed to the upper surface FSPI of the head PATI. Thus the various elements comprising the optical reading and magnetic writing device DLOEI according to the invention are affixed to one another as soon as the device itself is assembled.

The optical fiber FIBI has a low numerical aperture (large diameter). It transports the light originating in a nonpolarized light source, for example a diode laser located outside the device DLOEI. This fiber is characterized by its high coupling coefficient with the source of nonpolarized light, which requires that it be of the multimode type. It is known that such fibers do not preserve the direction of polarization of the light. The fiber is in contact at its end with the cube CUBI. The cube is as small in size as possible, for example being 1 mm on a side. The cube CUBI is formed by the association of two half-cubes $CUBI_1$ and $CUBI_2$ (i.e., two pyramids).

The light leaves the optical fiber in the form of a divergent beam, and the distance between the end of the optical fiber and the holographic lens is such that the beam is intercepted in its entirety by the holographic lens LHI.

The surface with which the two half-cubes $CUBI_1$ and $CUBI_2$ are in contact comprises the separator element ESI, which plays the same role as the separator element ES of the device according to the prior art shown in FIG. 2a; that is, it separates the incident beam $F_i$ from the reflected beam $F_r$.

The cube CUBI is fixed, for example by gluing, to the upper part FSPI of the head PATI, the gluing forming the support for the cube SUPI.

The cube has the following function: It separates the routes of propagation of the incident beam $F_i$ and the beam $F_r$ reflected by the magnetooptic disk, along two perpendicular directions, the first direction being that of the incident beam $F_i$. In this direction, the cube allows only light having a predetermined polarization direction to pass. The second direction is that of the reflected beam $F_r$. In this second direction, the reflected beam is directed toward the photoelectronic detectors. It is this light that carries the data.

The holographic lens LHI is in the form of a flat rectangle the dimensions of which are for example a length of 6 mm, a width of 4 mm and a thickness of 1 mm.

The holographic lens is used in preference to an assembly formed by an association of a mirror and a conventional focusing lens, such as the mirror MIR and the lens MFOC of FIG. 1a. In fact, the dimensions, light weight and low flying height of the platform (less than a micrometer) present problems of compatibility with the size, mass and optical power of conventional focusing lenses.

The use of holographic lenses for optical data reading is known: It is described, for example, in European Patent Application 86 301 994.9 (publication number 0 195 657) filed by the Fujitsu Company, designating France in particular, and in U.S. Pat. No. 4,626,679.

The holographic lens LHI is mounted via fixation leads PFIXI on the upper surface FSPI of the head PATI.

The lens LHI forms an angle θ on the order of 45° with the upper surface FSPI of the head PATI.

The holographic lens PHI produces the incident beam $F_i$, the opening of which is designated by the angle θ. The spot SPI produced by this beam on the surface of the disk DISC has a diameter on the order of a micrometer.

It should be noted that the holographic lens LHI may, for example, be a lens by the Centre Suisse d'Electronique et de Microtechnique S.A., located in Neuchatel in Switzerland.

The reflected beam $F_r$ has the same dimensions and the same opening angle as the incident beam $F_i$ both before and after passing through the holographic lens LHI.

The head PATI has the same general structure as the head PAT of the prior art device. This angle α is equal to one-half the opening angle of the beam $F_i$ (or $F_r$). Hence, α equals θ/2.

The transducer TMI is an integrated thin-film transducer of a well known type, for example, described in French Patent Application No. 84.20025 filed on Dec. 28, 1984, by the Compagnie Internationale pour L'Informatique CII HONEYWELL BULL (corresponding to U.S. Pat. Application Ser. No. 813,236, filed Dec. ≧, 1985, now U.S. Pat. No. 4,771,350 ), or as manufactured by the American company Read Write, in Milpitas, Calif. The plane of the thin films of the transducer TMI is also inclined by an angle α with respect to the normal to the plane of the disk DISC. The transducer TMI is embedded in a film CALI, for example made of alumina, which hence constitutes the trailing portion ARI of the head PATI.

The thickness, width and length of the head are calculated as a function of the dimensions of the various constituent optical elements of the reading device DLOEI according to the invention, as well as of their optical characteristics.

The beam $F_r$ reflected by the holographic lens LHI is reflected at the surface ESI and transmitted in the form of a divergent beam to the transmission means BILI. These means transform it into a substantially cylindrical beam. These transmission means BILI may comprise an optical ball 1 mm in diameter, that is, substantially having a diameter of the same dimension as the sides of the cube CUBI. The ball BILI is for example glued to the upper surface FSPI of the head PATI on the one hand and to one of the side faces of the cube CUBI on the other.

Preferably, the circuits comprising the detection means MDKI formed by a set of photoelectronic transducers and the amplifier circuits associated with them may be deposited on the upper surface FSPI of the head PATI in the form of a very large scale integrated circuit, or VLSI chip.

The optical control that enables optimization of the optical performance and optical trajectory of the beams $F_i$ and $F_r$ is performed at the time of assembly of the device DLOEI according to the invention. Once the control has been performed, the various constituent elements of the device DLOEI, that is, the optical fiber FIBI, the cube CUBI and the holographic lens LHI, the ball BILI and the means MDKI, are glued to the upper surface FSPI, for example by transmitting an ultraviolet beam onto a photosensitive glue.

Thus a device is obtained in which all the elements are affixed to one another, which makes it possible for the light beam $F_i$ to remain at a constant distance from the writing pole POLI of the transducer TMI.

Moreover, the fact that the trailing portion ARI of the head PATI is inclined by an angle α equal to one-half the opening angle of the focusing cone $F_1$ of the light makes it possible to avoid any parasitic reflection of the light beam on the walls of the head PATI.

Additionally, the dimensions and mass of the various elements FIBI, CUBI and LHI are entirely compatible with a stable flight of the head PATI, since their mass is on the order of several hundredths of a gram, while the weighing force of the head PATI is on the order of 10 g.

The invention accordingly relates to a particularly simple reading device, with which automatic control of the position of the reading beam with respect to the polar writing element, which would be necessary if the various elements comprising the optical reading device were not fixed to one another, can be dispensed with.

Figure 5:
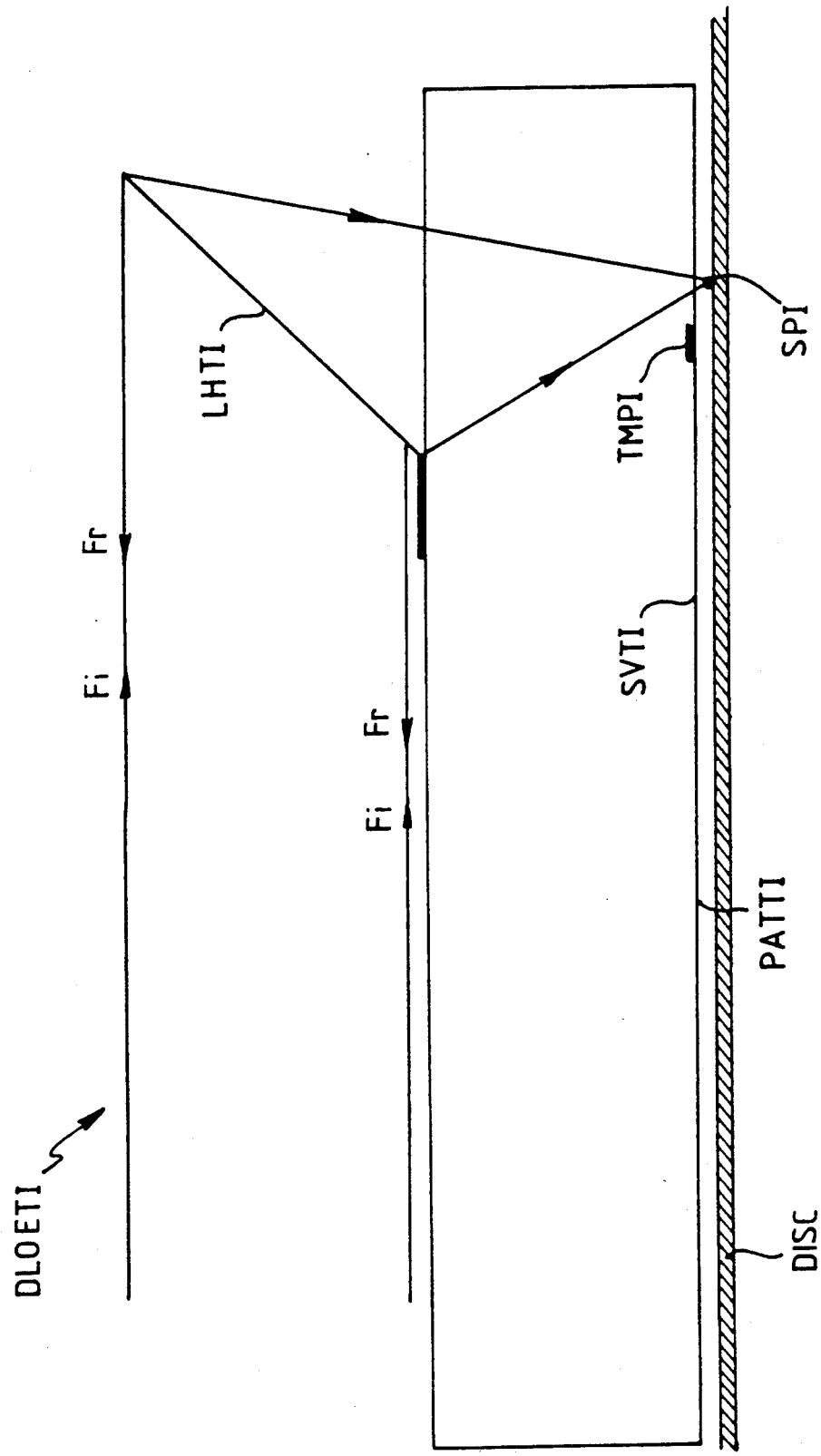
FIG. 5 shows another embodiment of the device according to the invention.

FIG. 5 shows another embodiment DLOETI of the optical reading and magnetooptic writing device according to the invention, in which all the constituent elements, the light source, cube, ball, detection means, holographic lens (here LHTI) are identical to those of the device DLOEI, except for the head PATTI, which is in the conventional parallelepiped form (for example, see FIG. 2b) but is transparent to light. As for the writing transducer TMPI, it is made of thin films and deposited flat on the flight surface SVTI of the head and is for example of the type described in U.S. Pat. No. 4,731,157).

What is claimed is:

1. An optical reading and magnetic writing device (DLOEI) for data on a magnetooptic recording carrier (DISC) including:
    magnetic writing means including:
    a transducer (TMI) for writing data on the carrier disposed on a head (PATI) flying above the carrier;
    optical reading means including:
    a light source (SLI) comprising a separator element (ESI) through which is emitted an incident beam of polarized light ($F_i$) through an optical means (LHI) to the surface of the carrier at a predetermined site thereon, wherein a magnetic state of the carrier at said predetermined site is adapted to produce a rotation of a plane of polarization of the light;
    said optical means (LHI) affixed to the head for focusing the incident beam ($F_i$) onto the surface of the carrier, said incident beam forming a light spot (SPI) on the surface of the carrier, said incident beam further being reflected at the carrier, becoming a reflected beam ($F_r$), said reflected beam ($F_r$) travels through said optical means to the separator element which separates the route of propagation of the incident beam ($F_i$) from the route of propagation of the reflected beam, which is then transmitted to:

means (MDKI) for detecting an angle of rotation of the plane of polarization of the reflected beam, furnishing an electric signal a voltage or current of which is a function of a value of the data located at said predetermined site, the source of polarized light (SLI) being disposed on and affixed to the head containing the writing transducer (TMI);

the optical means for focusing the beam ($F_i$) comprising a holographic lens (LHI) which is affixed to an upper portion (FSPI) of the head (PATI) and forms an angle of approximately 45° with the surface of said upper portion.

2. A device as defined by claim 1 wherein the writing transducer is a magnetic transducer including a magnetic writing pole (POLI), and wherein a distance, measured in a plane of the surface of the recording carrier, between the light spot (SPI) produced by the holographic lens (LHI) on the carrier surface and a projection of the writing pole on the carrier surface is less than about 10 μm.

3. A device as defined by claim 1, characterized in that the light source is formed by an association of an optical fiber (FIBI) the end of which is glued to one face of an optical cube (CUBI), and wherein said optical cube contains said separator element.

4. A device as defined by claim 3, characterized in that the reflected beam transmitted by the holographic lens (LHI) to the cube is further directed by the cube to the detection means (MDKI) via transmission means that transforms a divergent beam produced by the cube into a substantially cylindrical beam.

5. A device as defined by claim 4, characterized in that the transmission means (BILI) comprises an optical ball.

6. A device as defined by claim 1, characterized in that the detection means (MDKI) are affixed to an upper portion of the head.

7. A device as defined by claim 1, characterized in that the head (PATTI) is transparent to light.

8. An optical reading and magnetic writing device (DLOEI) for data on a magnetooptic recording carrier (DISC) including:

magnetic writing means including:

a transducer (TMI) for writing data on the carrier disposed on a head (PATI) flying above the carrier;

optical reading means including:

a light source (SLI) comprising a separator element (ESI) through which is emitted an incident beam of polarized light ($F_i$) through an optical means (LHI) to the surface of the carrier at a predetermined site thereon, wherein a magnetic state of the carrier at said predetermined site is adapted to produce a rotation of a plane of polarization of the light;

said optical means (LHI) affixed to the head for focusing the incident beam ($F_i$) onto the surface of the carrier, said incident beam forming a light spot (SPI) on the surface of the carrier, said incident beam further being reflected at the carrier, becoming a reflected beam ($F_r$), said reflected beam ($F_r$) travels through said optical means to the separator element which separates the route of propagation of the incident beam ($F_i$) from the route of propagation of the reflected beam, which is then transmitted to:

means (MDKI) for detecting an angle of rotation of the plane of polarization of the reflected beam, furnishing an electric signal a voltage or current of which is a function of a value of the data located at said predetermined site, the source of polarized light (SLI) being disposed on and affixed to the head containing the writing transducer (TMI);

the optical means for focusing the beam ($F_i$) comprising a holographic lens (LHI); and wherein the writing transducer is a magnetic transducer including a magnetic writing pole (POLI), and wherein a distance, measured in a plane of the surface of the recording carrier, between the light spot (SPI) produced by the holographic lens (LHI) on the carrier surface and a projection of the writing pole on the carrier surface is less than about 10 μm.

9. A device as defined by claim 8, characterized in that the light source is formed by an association of an optical fiber (FIBI) the end of which is glued to one face of an optical cube (CUBI), and wherein said optical cube contains said separator element (ESI).

10. A device as defined by claim 8, wherein an angle that a trailing face (FAI) of the head (PATI) forms with a normal to a plane of the magnetooptic recording carrier (DISC) is equal to one-half an opening angle of a cone formed by the incident beam ($F_i$).

11. A device as defined by claim 8, wherein the head (PATI) is transparent to light.

12. An optical reading and magnetic writing device (DLOEI) for data on a magnetooptic recording carrier (DISC) including:

magnetic writing means including:

a transducer (TMI) for writing data on the carrier disposed on a head (PATI) flying above the carrier;

optical reading means including:

a light source (SLI) comprising a separator element (ESI) through which is emitted an incident beam of polarized light ($F_i$) through an optical means (LHI) to the surface of the carrier at a predetermined site thereon, wherein a magnetic state of the carrier at said predetermined site is adapted to produce a rotation of a plane of polarization of the light;

said optical means (LHI) affixed to the head for focusing the incident beam ($F_i$) onto the surface of the carrier, said incident beam forming a light spot (SPI) on the surface of the carrier, said incident beam further being reflected at the carrier, becoming a reflected beam ($F_r$), said reflected beam ($F_r$) travels through said optical means to the separator element which separates the route of propagation of the incident beam ($F_i$) from the route of propagation of the reflected beam, which is then transmitted to:

means (MDKI) for detecting an angle of rotation of the plane of polarization of the reflected beam, furnishing an electric signal a voltage or current of which is a function of a value of the data located at said predetermined site, the source of polarized light (SLI) being disposed on and affixed to the head containing the writing transducer (TMI);

the optical means for focusing the beam ($F_i$) comprising a holographic lens (LHI); and wherein the light source is formed by an association of an optical fiber (FIBI) the end of which is glued to one face of an optical cube (CUBI) wherein said optical cube contains said separator element (ESI), and wherein the reflected beam transmitted by the holographic lens (LHI) to the cube is further directed by the cube to the detection means (MDKI) via transmission means (BILI) that transforms a divergent beam produced by the cube into a substantially cylindrical beam.

13. A device as defined by claim 12, characterized in that the reflected beam transmitted by the holographic lens (LHI) is transmitted to the cube, which directs it to the detection means (MDKI) via transmission means (BILI) that transforms a divergent beam produced by the cube into a substantially cylindrical beam.

14. A device as defined by claim 12, characterized in that the transmission means (BILI) comprises an optical ball.

15. A device as defined by claim 13, characterized in that the transmission means (BILI) comprises an optical ball.

16. An optical reading and magnetic writing device (DLOEI) for data on a magnetooptic recording carrier (DISC) including:

magnetic writing means including:

a transducer (TMI) for writing data on the carrier disposed on a head (PATI) flying above the carrier;

optical reading means including:

a light source (SLI) comprising a separator element (ESI) through which is emitted an incident beam of polarized light ($F_i$) through an optical means (LHI) to the surface of the carrier at a predetermined site thereon, wherein a magnetic state of the carrier at said predetermined site is adapted to produce a rotation of a plane of polarization of the light;

said optical means (LHI) affixed to the head for focusing the incident beam ($F_i$) onto the surface of the carrier, said incident beam forming a light spot (SPI) on the surface of the carrier, said incident beam further being reflected at the carrier, becoming a reflected beam ($F_r$), said reflected beam ($F_r$) travels through said optical means to the separator element which separates the route of propagation of the incident beam ($F_i$) from the route of propagation of the reflected beam which is then transmitted to:

means (MDKI) for detecting an angle of rotation of the plane of polarization of the reflected beam, furnishing an electric signal a voltage or current of which is a function of a value of the data located at said predetermined site, the source of polarized light (SLI) being disposed on and affixed to the head containing the writing transducer (TMI);

the optical means for focusing the beam ($F_i$) comprising a holographic lens (LHI); and wherein an angle that a trailing face (FAI) of the head (PATI) forms with a normal to a plane of the magnetooptic recording carrier (DISC) is equal to one-half an opening angle of a cone formed by the incident beam ($F_i$).

* * * * *